INVENTOR
Fred G Parsons

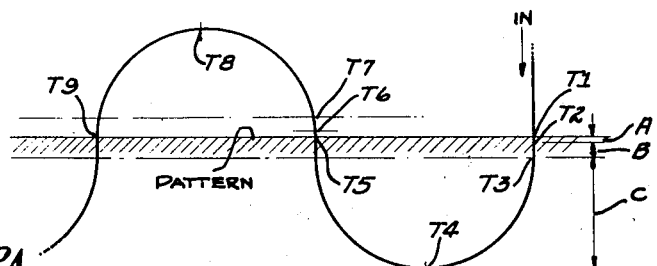
Fig. 2A
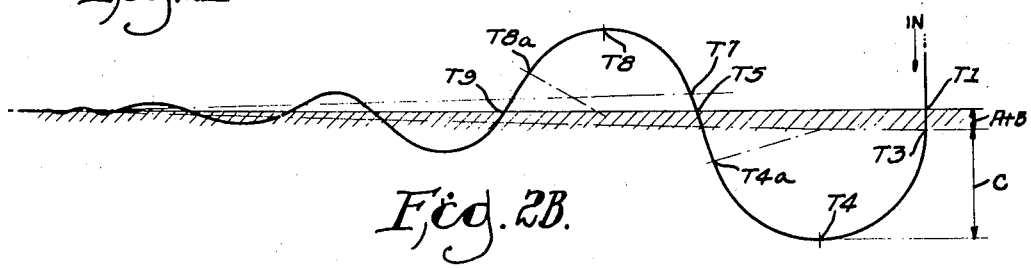
Fig. 2B
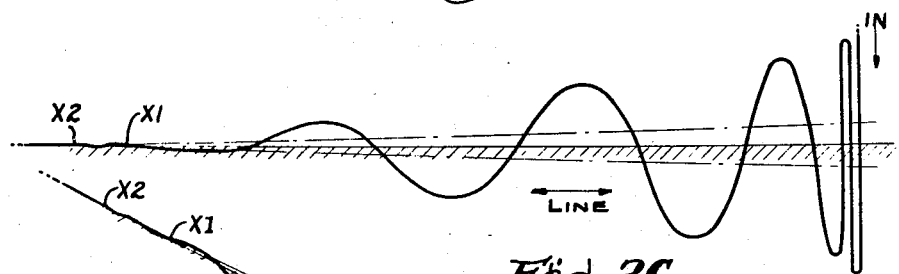
Fig. 2C
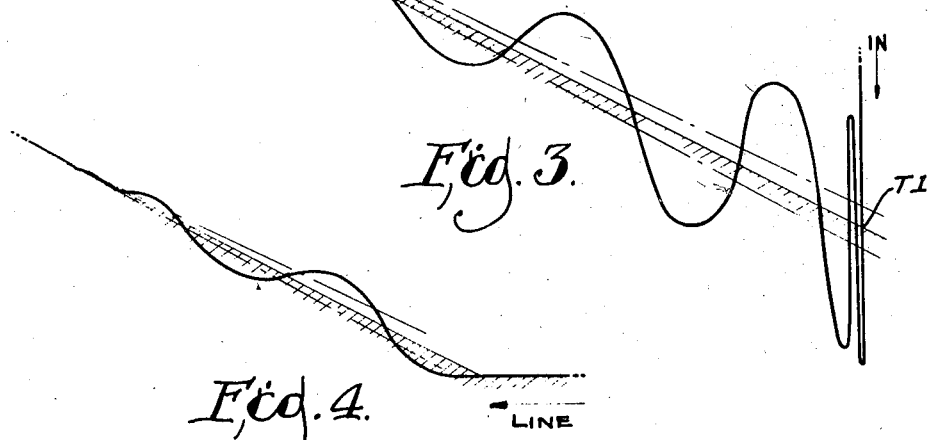
Fig. 3
Fig. 4

INVENTOR
Fred A. Parsons

Patented Jan. 10, 1950

2,493,828

UNITED STATES PATENT OFFICE 2,493,828

MACHINE-TOOL TRANSMISSION AND CONTROL MECHANISM

Fred A. Parsons, Milwaukee, Wis., assignor to Kearney & Trecker Corporation, West Allis, Wis., a corporation of Wisconsin Application June 18, 1945, Serial No. 600,205

15 Claims. (Cl. 90—13.5)

This invention relates to machine tools and particularly, but not exclusively, to copying machines. In some of its aspects the invention is coextensive with the invention disclosed in the copending application Serial No. 610,090, filed August 10, 1945, and some of the features of the present invention are improvements upon the invention of the copending application Serial No. 512,112, filed November 29, 1943.

A purpose of the invention is to provide driving mechanism of an improved form for a plurality of movable machine tool supports and an improved control mechanism therefor, and particularly for copying machines.

A further purpose is to provide improved alternatively available control mechanism for a plurality of movable machine tool supports such that the power movements of the supports may be selectively controlled either manually, or for automatically copying the configuration of a pattern or master.

A further purpose is to provide control means such as just mentioned in an improved form which operates for the automatic copying control to become effective whenever the manual control is operated to bring the tool within a normally pattern controlled zone.

Pattern controlled copying normally involves overrun of the parts, with resulting oscillations or jiggles, whenever there is a change of pattern angle or movement direction. A further purpose is to provide an improved primary direction correction means in a form which minimizes the initial overrun, whereby initial oscillations are of minimum amplitude, and operative to stabilize and progressively reduce the amplitude of any initial oscillations to substantially zero value in a minimum time.

A further purpose is to provide the primary direction correcting means in a form to effect tool path direction corrections with a minimum of power.

A further purpose is to provide a transmission mechanism and primary tool path correction means therefor in combination with straight-path supplemental control means cooperative therewith to eliminate oscillations or jiggles during the copying of any straight-path pattern portion.

A further purpose is to provide such primary control means and supplemental straight-path control means in an improved form and relationship such that the presence of the straight-path control means does not operate to delay the operation of the primary control means.

A further purpose is generally to simplify and improve the construction, organization, and operation of machine tools, and particularly of copying machines, and still other purposes will be apparent from this specification.

Various modifications of the invention herein illustrated and described are contemplated, and it is to be understood that the invention includes all modifications within the spirit and scope of the claims.

Throughout the specification the same reference characters have been used to identify the same parts, and in the drawings:

Figures 2A, 2B are diagrams in greatly enlarged scale for a preliminary explanation of the copying operation shown in the diagram of Fig. 2C.

Figure 2C is a diagram in greatly enlarged scale for explanation of initial in-out oscillations such as occur in the present machine when the pattern requires a change of tool-path direction from straight-in to straight-path line movement.

Figure 3 is a diagram in greatly enlarged scale for explanation of initial in-out oscillations such as occur in the present machine when the pattern requires a change from straight in to straight-path outward movement at an angle of about 30° to the line movement.

Figure 4 is a diagram in greatly enlarged scale for explanation of initial in-out oscillations such as occur in the present machine when the pattern requires a change from straight line to straight-path outward movement at an angle of about 30° to the line movement.

Figure 1:
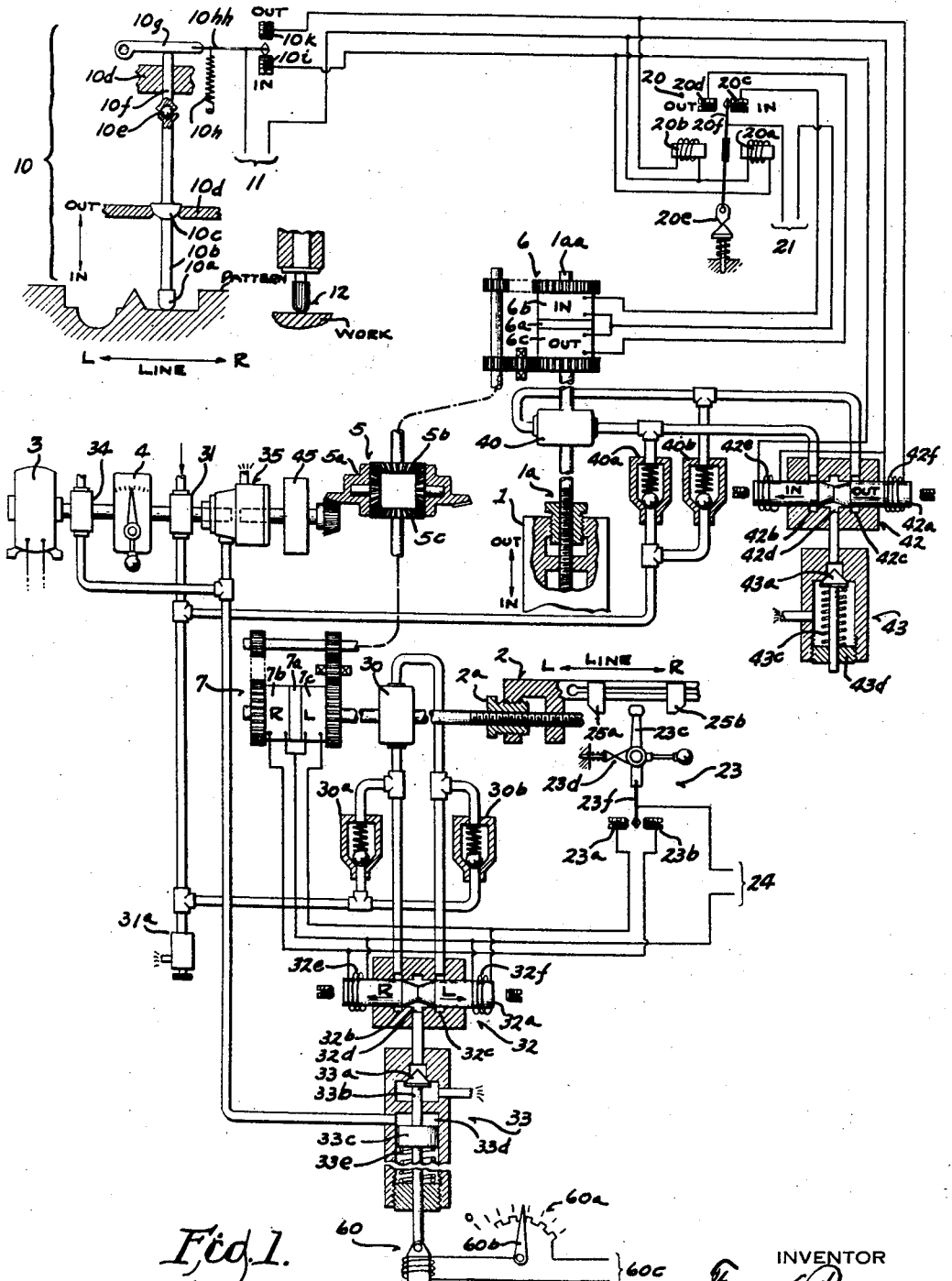
Figure 1 is a diagram showing transmission and control mechanism suited for carrying out the invention in some of its aspects, and showing the relationship of the parts.

Referring to Fig. 1, an in-out support 1 and a line support 2 are both driven from an electric motor 3 of substantially constant speed type, or other suitable constant speed driver means, through a feed rate changer 4; the rate changer driving the cage 5a of a differential device 5.

An output gear 5b, Fig. 1, of the differential drives the in-out support 1 through an electromagnetic reverser device 6 and screw and nut means 1a. The reverser 6 includes a clutch member 6a connected for positive actuation of the support through the screw-nut means and clutch members 6b, 6c oppositely driven from differential gear 5b in in and out directions respectively, and alternatively energizable to drive the member 6a. The screw-nut means 1a includes two nut elements carried by the support, as shown, relatively adjustable axially to eliminate lost motion between the screw and support 1.

The other output gear 5c of the differential drives the line support 2 in similar manner, there being an electromagnetic reverser device 7 and screw and nut means 2a. The reverser 7 includes a clutch member 7a connected for positive actuation of the support through the screw-nut means 2a and members 7b, 7c driven from differential gear 5c in opposite directions respectively and alternatively energizable to drive the member 7a. The screw-nut means 2a includes two nut elements carried by the support, as shown, relatively axially adjustable to eliminate lost motion between the screw and support 2.

The ratio of the trains connecting the differential gears 5b, 5c to the supports 1 and 2 respectively is such that equal speeds of the gears effect equal rates for the supports, but the driving and control arrangement provides that either support may have any rate of movement between zero and a maximum rate determined by the adjustment of rate changer 4, subject to the limitation that the sum of the support speeds is constant for any given rate changer adjustment, as will be explained.

Thus, the cage 5a of the differential is unidirectionally driven from motor 3, and equal unidirectional torques are applied through the pivoted gears in such manner that the sum of the speeds of gears 5b, 5c must equal twice the speed of cage 5a. It results that when the speed of either gear 5b or 5c is zero the other gear revolves at a maximum speed which is twice the speed of cage 5a, the maximum gear speed being determined in part by the speed of motor 3 and in part by the instant adjustment of rate changer 4. However, the driving arrangement is indifferent to the relative speeds of the gears 5b, 5c and either gear may have any speed, provided the sum of the gear speeds equals twice the cage speed as stated.

In the present machine the instant relative speeds of gears 5b, 5c and of the supports 1 and 2 driven therethrough are determined by controlling the relative value of resistance forces opposing the respective support trains, as will be described.

The machine includes a tracer 10 and a rotary cutting tool 12, Fig. 1. These parts are associated with the transmission and control mechanism in a particular manner, later described, but for convenience are shown spaced apart in Fig. 1, and in relatively larger scale. The tracer 10 includes a stylus or pattern contacting member 10a which is carried on an extended rod or shank 10b having a ball form pivot portion at 10c operating in a suitable ball form socket carried by the tracer frame or support 10d. At the end opposite the stylus the shank 10b carries a cone socket receiving a ball 10e which also engages a similar cone socket on the one end of a plunger 10f. At the other end the plunger 10f engages a pivoted contactor bar 10g which is continuously urged by a spring 10h in a direction to establish a predetermined position of the stylus relative to the frame both downwardly and laterally in Fig. 1, the plunger being guided in the frame 10d in such manner that the ball 10e operates to center the stylus laterally and the pivot 10c operates to limit the downward movement.

The pivoted tracer contact bar 10g carries a yieldable contactor member 10hh and associated therewith is an in contact 10i and an out contact 10k each adjustably carried by the frame 10d. The in contact 10i is adjusted to such position that when the stylus is free of the pattern, whereby it is in the predetermined laterally centered and downwardly limited position to which it is continuously urged by spring 10h as stated, the in contact is closed for operation of control means, later described, from a power circuit 11. The out contact 10k is adjusted to such position that when the stylus is shifted from the described in contact position, either upwardly in Fig. 1 or in any lateral direction, the in contact will be opened and the out contact 10k will be closed for other control effects, later described, from the circuit 11.

For a certain type of copying operation herein called profiling, successive opposite line-direction movements are spaced apart in a third path, not shown, transverse to both the in-out and line path, later herein referred to as a cross path of movement. For such profile copying in the present machine both the tracer 10 and the rotary cutter 12, Fig. 1, are fixed with the in-out support for bodily movement therewith in out or in direction by the means of suitable brackets or supports, not shown, acting to position the axis of the rotary cutter parallel with the axis of the tracer shank 10b when the tracer stylus is free of the pattern, that is to say when the stylus is in the in position previously described, both axes then being parallel to the in-out path of support 1 and vertical to the line path of support 2. The brackets or supports mentioned also position the tracer and cutter with their axes spaced apart in line direction, as indicated in Fig. 1. The pattern and work members indicated in Fig. 1. are fixed on the line support 2 by the means of suitable clamps or fixtures, not shown, which provide for various spacing thereof in line direction to suit different dimensions thereof; the brackets or supports for the cutter and tracer also providing for relative adjustment thereof in line direction to suit the various spacings of the pattern and work. The described arrangement of tracer 10, cutter 12 and supports 1 and 2 for profiling operations permit the stylus to follow the profile of any pattern within the capacity of the machine, and the cutter to correspondingly follow the work piece. Other well-known arrangement of the parts might be used for profiling purposes, however, and any suitable arrangement is contemplated. Suitable power transmission means, not shown, is provided for rotating the cutter 12 selectively at various speeds in any position of its bodily in-out movement or its line direction movement or adjustment.

Means, not shown, are provided for the above mentioned cross movement of the pattern and work, relative to the tracer and cutter, in a path transverse to both the in-out and line paths as previously described. Several types of cross feed mechanism for such purpose are well known, and any suitable type may be used in the present machine.

For another type of copying operations, herein called contouring, the tracer and cutter are arranged with their axes mutually parallel as above mentioned, but in this case each vertical to both the in-out and the line movement. Both profiling and contouring operations are contemplated in the present machine, and for the contouring other tracer and cutter positioning brackets or supports, not shown, are provided to effect the axial arrangement just mentioned, in any suitable well-known manner.

It will be understood that various well-known types of tracers may be used for the machine of Fig. 1, and the use of any suitable type is contemplated. It is preferable, however, for reasons later explained, that there should be a control position, intermediate between the described in and out positions of the stylus, in which the connection of the control power circuit 11 is interrupted.

The in-out reverser 6, Fig. 1, is controlled from tracer 10 through the contacts 10i, 10k and a relay switch 20. When the tracer in contact 10i is closed a switch solenoid 20a is energized to shift a contactor 20f and close an in contact 20c whereby to energize suitable coils, not shown, of the in clutch member 6b from a circuit 21, thereby to urge member 6a and support 1 in in direction. When the tracer out contact 10k is closed a switch solenoid 20b is energized to close an out contact 20d whereby to energize suitable coils, not shown, of the out clutch members 6c from the circuit 21 whereby the support 1 is urged in out direction. Means diagrammatically indicated at 20e operate to maintain the switch 20 in either in or out contact position until the tracer operates to effect the opposite contact position. It results that the last energized clutch member 6b, 6c will remain energized when the tracer stylus 10a is in the interrupting position, previously mentioned, in which both the solenoids 20a, 20b are deenergized.

The line reverser 7, Fig. 1, is controlled from a snapover type of switch 23 which operates to effect reversal of movement of the line support 2 at each end of the line movement. Thus the switch 23 provides contacts 23a, 23b respectively for energizing suitable coils, not shown, of the clutch elements 7c, 7b which respectively operate for left and right movement, Fig. 1, of line support 2, the coils being energized from a circuit 24. During the right-hand support movement a dog 25a adjustably carried on support 2 contacts an arm 23c of the switch, thereby shifting a contactor 23f to a position for effecting left movement. Similarly during the left movement an adjustable dog 25b contacts the switch arm to effect right movement. The dogs are adjustable in any suitable manner on support 2 for determining the range of line traverse movements. The switch 23 includes detent means diagrammatically indicated at 23d which operates to yieldably retain either contact 23a or 23b closed until such time as the dogs operate to effect the reversal of line movement as described. Suitable hand lever means are provided, as shown, to shift the switch independently of the dogs.

A reversible positive acting hydraulic brake pump 30, Fig. 1, of any suitable type is arranged to be driven from the differential gear 5c through the line reverser clutch member 7a, whereby the instant direction of delivery of liquid from the pump corresponds to the instant direction of movement of line support 2. Another pump 31 is unidirectionally driven through the rate changer 4 from a point between the rate changer and the differential 5, and supplies liquid from any suitable reservoir, not shown, to the inlet side of the pump 30 in either direction of rotation thereof, the pressure of the supplied liquid being adjustably determined by a relief valve 31a of any suitable type. The pressure liquid is supplied to the pump 30 through the one or the other of one-way valves 30a, 30b according to the instant direction of pump rotation, since in either pump direction one valve operates to admit the liquid to the instant inlet port of the pump while the other valve closes to prevent the liquid from the instant outlet port from escaping back into the supply channel.

A valve 32, Fig. 1, provides a shiftable plunger 32a and spaced inlet ports 32b, 32c respectively connected through closed channels to the different ports of the pump 30, the valve having an outlet port 32d connected to a back pressure control valve 33. When the shiftable plunger 32a is in its central position, as shown in Fig. 1, it close communications between the outlet port 32d and both of the inlet ports 32b, 32c, but the plunger provides an annular groove, as shown, which connects the outlet port with the inlet port 32b or 32c accordingly as the plunger is shifted in the one or the other direction from its central position shown in Fig. 1, while maintaining the other inlet port closed from communication with the outlet port. The plunger 32a is connected to be shifted in the one or the other direction accordingly as the switch 23 is positioned for the reverser 7 to effect the lift or right directions of movement of the line support 2, that is to say in accordance with the instant direction of rotation of pump 30; the arrangement being such that in either direction of support movement the pump 30 delivers its output liquid through valve 32 to the back pressure control valve 33. To effect such result there are provided valve shifting solenoids 32f, 32e respectively in shunt with the energizing coils, not shown, of the different clutch members 7b, 7c. When either clutch member is energized from switch 23, as previously described, the valve plunger is simultaneously shifted to effect the proper connection of the instant outlet port of pump 30 with back pressure valve 33

The back pressure valve 33, Fig. 1, includes a throttle member 33a fixed with a shank on plunger 33b, upon which is also fixed a piston member 33c operating in a suitable cylinder 33d. A spring 33e operates to continuously urge the throttle member 32a toward closed position, but the throttle may be urged in the other direction by liquid pressure in cylinder 33d acting against piston 33c.

The pressure of the liquid acting on piston 33c, Fig. 1, varies directly as the instant torque operating to drive the differential cage 5a. Thus the cylinder 33d of valve 33 is continuously supplied with liquid under pressure from a positive delivery pump 34 of any suitable type which draws liquid from a suitable reservoir, not shown. Pump 34 is driven from a point between the driver 3 and rate changer 4 and is therefore of substantially constant volume delivery. The pump is connected to the cylinder 33d through closed channels whereby the pumped liquid has no escape except through a torque responsive device, generally denoted as 35, which operates in the transmission at a point between the rate changer 4 and the differential 5, and the device 35 operates to continuously effect a pressure of the pumped liquid which varies directly in accordance with the torque transmitted through device 35 as stated. The torque responsive device 3 may be of any suitable type but in the present instance is of the construction shown and described in the Patent No. 2,355,554, issued August 8, 1944, and therefore will not here be described in detail.

The described arrangement of pump 30, valve 32, back pressure valve 33 and torque device 35, etc., operates to effect brake means continuously establishing and controlling a line resistance force on brake pump 30 opposing rotation of the brake pump in either direction thereof and thereby continuously opposing rotation of the differential gear 5c and movement of the line support 2 driven therethrough, for purposes later described.

A reversible positive acting hydraulic brake pump 40, Fig. 1, is arranged to be driven from the differential gear 5b through the in-out reverser clutch member 6a, whereby the instant direction of delivery of pressure liquid from pump 40 corresponds to the instant direction of movement of in-out support 1. Pump 40 is supplied with liquid from the pump 31 which also supplies pressure liquid to the pump 30 of the line transmission, as described, and is of the same volumetric delivery as pump 30. Therefore, since the sum of the speeds of pumps 30 and 40 is constant as determined by the rate changer adjustment by reason of the differential action previously described, and the supply pump 31 is driven through the rate changer 4, the pump 31 need supply a constant volume of liquid sufficient only to provide a small excess to be bypassed through the relief valve 31a. Similarly to the line brake pump 30, the pressure liquid to pump 40 is supplied in either driven direction to the instant inlet port thereof through the one or the other of one-way valves 40a, 40b while the other one-way valve operates to prevent the liquid from the pump outlet port from returning to the supply channel. Also similarly to the line pump arrangement, there is a valve 42 for directing the pressure liquid from the pump 40 to an in-out back pressure valve 43. Thus the valve 42 provides a plunger 42a, spaced inlet ports 42b, 42c and an outlet port 42d communicating with back pressure valve 43, and solenoid coils 42e, 42f respectively energized from the tracer in contact 10i and the tracer out contact 10k, the valve plunger providing oppositely tapered groove portions, as diagrammatically shown in Fig. 1, for closing the one inlet port and opening the other to communication with the outlet port whenever the plunger is shifted from the central position shown in Fig. 1. The tapered groove portions of the valve plunger 42a, under certain conditions of operation, later-described, operate as throttles for restricting the flow of liquid through valve 42.

The back pressure valve 43 provides a throttle member 43a urged toward closed position by a spring 43d having an adjustable abutment 43d which is determinative of the back pressure effected by the throttle member, such back pressure operating continuously to effect an in-out resistance opposing the rotation of brake-pump 40 and of sufficient value to eliminate slack or lost motion in the transmission parts interconnecting supports 1 and 2, and motor 3.

Various pattern surfaces to be copied require tool movement at various angles relative to the in-out and line paths. In the present machine any pattern angles may be copied, either inwardly or outwardly, between the limits of 0° and 90° as measured from a base line parallel to the line path of movement, either for profiling or contouring operations. It is to be understood that, for convenience, any pattern angles later mentioned are referred to a base line parallel to the line path as stated. Also, for convenience, the angles will be designated as in or out angles accordingly as the angle requires inward or outward movement during the copying. For certain operations, particularly for profiling, the work is alternately traversed by the tool in opposite directions of line movement and in such case the same pattern surface may be copied as an inward angle in one direction of line movement and as an outward angle in the other direction of line movement as is apparent in Fig. 1. However, for other operations, particularly for contouring, the work may be traversed in only one line direction. For either profiling or contouring copying operations the control from the tracer 10 operates to determine both the direction of movement in the in-out path and the relative rates of the in-out and line supports to copy the instant angle of the pattern, as will be explained.

The valve 33, Fig. 1, previously described, operates for maintaining a resistance force on brake pump 30 continuously urging deceleration of the line transmission including the support 2 and gear 5c. Thus, the arrangement of the torque device 35 and piston 33c is such that the pressure of the liquid on piston 33c varies directly as the torque transmitted by driver 3, as has been explained. The torque device 35, spring 33e, piston 33c and throttle 33a collectively have characteristics such that the throttle is fully open, whereby to effect substantially zero back pressure on pump 30, only when the driving torque applied through device 35 is at a predetermined value. The mentioned characteristics are also such that at a predetermined smaller value of the torque through device 35 the throttle 33a is fully closed. The differential 5 operates to continuously equalize the torques applied to the gears 5b, 5c, and such smaller predetermined torque value is established according to the capacity rating of the machine, being such that when it is applied through the differential cage to the driving gear 5b of the in-out transmission it is sufficient to accelerate the in-out transmission and support 1 at a predetermined minimum rate against the maximum in or out resistance which can normally occur during operation of the machine. The described arrangement operates for the line resistance to cause deceleration of the line support and simultaneous acceleration of the in-out support at rates at least as great as said predetermined minimum rate except as the tracer control, or the manual control means later described, operates to set up an in-out resistance sufficient to balance or to overcome the line resistance, as later described.

Thus, when the tracer stylus 10a, Fig. 1, is free of the pattern, the tracer in contact 10i is then closed, the switch 20 and valve 42 are then in in position and the in member 6b of the reverser clutch 6 is energized. In such case any resistance to in movement will be overcome by the previously mentioned smaller torque, whereby the throttle 33a is closed by reason of the described characteristics controlling the opening and closing thereof. When the throttle 33a is closed as just mentioned the line movement must decelerate to zero velocity, since there is then no escape for the liquid from brake pump 30, and during such line deceleration all of the kinetic energy of the constant speed motor 3 must expend itself in urging acceleration of the in velocity. Such in acceleration must occur at a rate not less than the predetermined acceleration rate previously mentioned, and if the instant resistance opposing the in movement is less than the mentioned maximum value as determined by the capacity rating of the machine the rate of the in acceleration will be correspondingly increased. In any event, provided the tracer in contact remains closed as described for a sufficient time interval the result will be to effect zero velocity of the line movement, and a maximum velocity of the in movement as determined by the adjustment of rate changer 4. Similarly, if the tracer out contact 10k remains closed for a sufficient time interval the out movement will be accelerated to maximum velocity.

During copying operations, however, the tracer control operates to effect relative in-out and line velocities to suit the instant pattern angle, as will now be explained. Referring to the diagram, Fig. 2A, it is there assumed that the in movement has been accelerated to maximum velocity as determined by rate changer 4, with accompanying zero line velocity, by the closing of the in contact as previously described, and that the instant pattern surface to be copied is 0°, that is to say parallel with the line movement, whereby a maximum line velocity and zero in-out velocity is required for the copying. During the in movement at maximum rate, the tracer stylus contacts the pattern at a point indicated as T1, Fig. 2A, whereby to open the tracer in contact 10i and close the tracer out contact 10k, and the result will be a series of in-out oscillations of the support 1, Fig. 1, which reduces the in-out velocity to zero value and increases the line velocity to maximum, as will now be described. It is to be understood, however, that the diagram of Fig. 2A is merely for purpose of preliminary explanation.

When the tracer stylus strikes the pattern at the point T1, Fig. 2A, the first result is to open the tracer in contact and close the out contact, as stated. Such closing of the out contact requires a certain amount of movement of the tracer stylus, involving a time interval which may be designated as "tracer-lag," and during such interval there is continued in movement at maximum velocity. In Fig. 2A it is assumed that the out contact closes at point T2 when the support 2 has travelled inwardly through a tracer-lag distance indicated as A.

Following the closing of the tracer out contact at point T2, Fig. 2A, as described, there will be an interval, which may be designated as "relay-lag," required for energizing the solenoid 42f, Fig. 1, and shifting the plunger 42a to out position, and during such interval the in movement continues. In Fig. 2A it is assumed that the shift of plunger 42f to out position is completed at point T3 when the support 1, Fig. 1, has travelled farther inwardly through a relay-lag distance indicated as B.

When the support 1, Fig. 1, is travelling inwardly with the valve plunger 42a in out position, as just described, there is no outlet for the escape of liquid from brake pump 40, since the valve plunger 42a then prevents delivery of liquid to the back pressure valve 43, and the one-way valve 40b prevents escape of liquid to return to the supply channel of pump 40, the valve 40b being already closed during the previous in movement. Therefore, when the valve plunger 42a is shifted to the out position during in movement, as described, the pump 40 operates as a positive brake means opposing any continued inward movement of the in-out transmission including the support 1 and the driving gear 5b, the braking pressure rising to maximum when the plunger passes its central position of Fig. 1. The momentum of the support 1 and transmission parts will prevent the brake from instantaneously stopping the support 1, but the result will be to effect a very high rate of in deceleration, such rate being limited only by the strength of the channel walls which operate to confine the liquid in the closed space between pump 40 and valve 42. In Fig. 2A the positive brake means is assumed to have decelerated support 1 to zero velocity at the point T4, after an interval which may be designated as "machine lag." During such interval the support moves inwardly through a machine-lag distance indicated as C, Fig. 2A.

The closing of the tracer out contact as just described also operates through relay switch 20 to deenergize the in clutch member 6b of reverser 6 and substantially simultaneously to energize the out clutch member 6c. Any out torque then operating from the clutch member 6c to the clutch member 6a assists the positive brake means in deceleration of the in movement as just described. At point T4, Fig. 2A, the out contact of both the tracer 10 and of switch 20 are still closed, and the torque then operating on the in-out driving gear 5b then operates through clutch member 6c to effect acceleration of the support 1 in out direction. Such out acceleration is not materially opposed by the brake-pump 40, since the valve 42 already stands in out position, as described. During the out acceleration which starts at point T4, Fig. 2A, the line brake means including pump 30 and valve 33 continues to operate as described to maintain a driving torque on the gear 5b sufficient for acceleration of the in-out transmission at not less than said predetermined minimum rate, as described, and the resulting out movement of the support 1 operates to move the tracer stylus free of the pattern surface at a point indicated at T5, Fig. 2A, at which point the tracer in contact 10i will again be closed.

It will be apparent from the foregoing that the line T1—T5, Fig. 2A, disregarding the extension in line direction, represents a half-cycle of in-out oscillation of the support 1 during which in movement is decelerated to zero velocity between points T1 to T4 and out movement is then accelerated. It will be also apparent that as soon as the tracer stylus clears the pattern as described at point T5, Fig. 2A, the tracer will initiate another oscillation half-cycle as indicated by the line T5—T6—T7—T8—T9, Fig. 2A, which is exactly similar to the described first half-cycle except that it is now the out movement which is decelerated to zero velocity, at a point indicated as T8, and the in movement which is accelerated from point T8 to point T9. Points T1 to T9 therefore represent a complete oscillation cycle, and at point T9 another similar cycle starts with the closing of the tracer out contact.

In the described operation of the diagram Fig. 2A in-out oscillation cycles such as T1 to T9 might continue indefinitely by reason of the alternate closing of the out and in contacts of tracer 10, as described, except that the oscillations operate to progressively accelerate the line velocity of gear 5c and support 2, Fig. 1, and due to the constant sum of the support speeds, as previously described, such line acceleration operates to simultaneously progressively reduce the in-out velocity of the oscillations, as will now be described.

Thus it will be apparent that during each of the deceleration phases of the in-out oscillations of Fig. 2A, as between points T1 to T4, T5 to T8 etc., the resistance force set up by the described positive-brake operation of pump 40 and valve 42 operates in a direction opposing the in-out driving gear 5b of the differential, whereby during such deceleration phases none of the kinetic energy supplied by constant speed motor 3 to the differential cage 5a can be expended through the in-out train. And since the differential itself operates substantially rigidly for transmission of kinetic energy, all of the kinetic energy applied to the cage 5a during such deceleration phases must be expended through the line drive gear 5c. During the described acceleration phases of the in-out oscillation of Fig. 2A, as between points T4 to T5, T8 to T9 etc., some kinetic energy may be expended through the in-out drive gear 5b, but the value of the energy which can be so expended during any half-cycle is materially less than is supplied through cage 5a during the same half-cycle. This is in part because the rate of deceleration effected, as described, by the positive brake means is greater than any possible rate of acceleration which can be effected by the driving motor, and for oscillations such as described a deceleration rate which is greater than the acceleration rate operates to progressively reduce the amplitude of the in-out oscillations, as has been fully explained in said copending application Serial No. 512,112. It results that in-out oscillations such as described for Fig. 2A force the major part of the energy received by the differential during each oscillation half-cycle to be expended through the line drive gear 5c, since otherwise the constant speed driver 3 would stall, because short of stalling the driver the torque applied by the driver 3 continues to increase to whatever extent is necessary to maintain the driver at constant speed.

For the operation of Fig. 2A, however, it was assumed that the in velocity is maximum at the start of the operation, in which case the line velocity is then at zero rate for reasons previously explained. Therefore no energy at all can be expended through the line drive gear 5c as described, except as the gear, and support 2, are accelerated. Substantially all of the driver energy must therefore operate for the acceleration of gear 5c and line support 2 during each half cycle of the described oscillations.

During the oscillations the driving torque increases equally on each of the gears 5b, 5c with a proportionate increase of torque through the device 35, and the acceleration of the line support 2 is materially assisted by the described characteristic of the control of line back pressure valve 33 from torque device 35. Thus, as has been stated, any increase of torque through the torque device 35, above the smaller value which permits the throttle 33a to close, operates in a direction to open the throttle. Also, as stated, the operating characteristics of the spring 33e and piston 33c etc. of the valve are such that only a relatively small increase of torque through device 35 is required to shift the throttle 33a from fully closed to fully open position, and since a torque value sufficient for the in-out acceleration against maximum cutting load resistance is normally also sufficient for acceleration of the line velocity against maximum line cutting load, whereby a suitable selection of operating characteristics for valve 33 and its associated parts results in acceleration of the line velocity during the in-out oscillation with a driving torque only slightly greater than the smaller torque established as described for the acceleration of the in-out velocity. In other words, the back pressure valve 33 and its associated parts have operating characteristics such that the described line acceleration during the in-out oscillation cycles of Fig. 2A is effected principally by the reduction of the line resistance established by valve 33, whereby only a relatively small increase of driving torque is required from the constant speed source 3 for effecting the acceleration of line support 2 in the manner described.

Fig. 2B is a diagram for explanation of a characteristic result of progressive acceleration of the line movement, such as occurs, as described, during the in-out oscillation cycles. In Fig. 2B, similarly to Fig. 2A, the spacing of the in-out oscillations in line direction has no significance, this diagram also being for preliminary purposes. In Fig. 2B it is assumed, for convenience, that the line movement starts to accelerate, as previously described, during the first deceleration phase of the oscillation cycles, that is to say during the time interval T1 to T4, Fig. 2A. In such case the first acceleration phase, during the time interval T4 to T5, Figs. 2A, 2B, cannot operate to accelerate the out movement to maximum velocity, since if gear 5c has any velocity the gear 5b must have less than maximum velocity, as has been explained. It results that at some point in the out acceleration phase, at a point where the sum of the speeds of gears 5b, 5c equals twice the speed of cage 5a, the acceleration of the out velocity ceases, and the combined out and line velocities then effect an angular outward path, assumed to start at point T4a of Fig. 2B, which continues until the start, at point T7, Fig. 2B, of the second deceleration phase of the oscillation.

And, since the out velocity at point T7, Fig. 2B, has been reduced as described, the out distance value of each of the tracer relag, relay lag and machine lag intervals previously described is correspondingly reduced for the second deceleration phase T7 to T8, Fig. 2B, as is indicated in the diagram by the reduced amplitude of the second half-cycle as compared with the total lag distance A+B+C for the first half-cycle. Similarly, it will be apparent that the third half-cycle and each subsequent half-cycle of the oscillation of Fig. 2B is progressively reduced in amplitude, as indicated, by the combined operation of progressive acceleration of the line velocity, and the progressive reduction of initial out or in velocity.

In Fig. 2C the diagram is more nearly representative of the actual in-out oscillation path during the period of line acceleration described for Figs. 2A, 2B. Thus where the line velocity is initially zero, as at point T1 of Figs. 2A, 2B, 2C, there will be, as shown in Fig. 2C, some initial oscillations in which the line movement is relatively slow, whereby the in-out oscillations are closely spaced in line direction. However, the spacing increases in line direction as the line velocity increases and the in-out velocity decreases as described for Fig. 2B. At some point such as X1, Fig. 2C, where the in-out velocity approaches zero, the combined in-out and line movements effect a substantially 0° angle relative to the line path and the amplitude of the oscillations becomes of small value, being principally determined by the spacing of the in and out tracer contacts, which is relatively small as has been stated.

Also, at such point X1, Fig. 2C, the interval during which either of the tracer contacts remains closed for the energizing of the brake valve solenoids 42e or 42f is reduced in substantial correspondence with the reduced amplitude of the oscillations. As the path of support movement approaches a 0° angle in Fig. 2C neither tracer contact remains closed for a sufficient period to fully shift the brake valve plunger 42a in either direction of its movement. The result is alternate opposite movements or oscillations of the plunger in which the normal plunger movement is only partially completed in either direction. For the 0° pattern angle of Fig. 2C, such movements are centered about the central position of the plunger which operates to fully close the outlet of liquid from the brake pump 40 in either the out or in direction of its rotation as has been described. The plunger oscillations decrease in amplitude along with the support oscillations and the result for the 0° pattern angle of Fig. 2C is that the valve plunger comes to rest in its central position at a time when the support 1 has zero in-out velocity and at a time when the tracer stylus is positioned for both the in and out tracer contacts to be open. Such point is indicated at X2 in Fig. 2C.

At such time the one or the other of the reverser clutch members 6b, 6c will be energized, since the relay switch 20 is constructed, as described, to remain in its last energized position. Under such conditions the energized clutch member and the central position of the brake valve plunger 42 operate to prevent acceleration of the in-out transmission in either in or out direction, irrespective of any value of resistance to line movement, unless and until the pattern angle changes sufficiently to close one or the other of the tracer contacts whereby to shift the valve plunger 42a out of its central position. Therefore, from the point X1, Fig. 2C, where the in-out oscillation and valve plunger oscillation ceases, as described, the copying of the 0° straight-line pattern surface of Fig. 2C continues as a straight-path movement with zero in-out velocity and maximum line velocity until there is some change of conditions sufficient to close one or the other of the in or out tracer contacts.

The supplemental straight-path copying result, effected by initial in-out oscillations as just described for the 0° pattern angle of Fig. 2C, is similarly effected for any pattern angle. Thus in Fig. 3, where the pattern has about a 30° out angle, the tracer strikes the pattern at point T1 of the diagram while the in movement is at maximum velocity and the line movement is at zero velocity, similarly to Fig. 2C, and the control mechanism operates in the same manner described for the 0° angle of Fig. 2C to effect initial in-out oscillations. For every angle, however, including the 30° angle of Fig. 3, the tracer control operates to center the in-out oscillations on the pattern surface instantly contacted by the stylus. The initial in-out oscillations of Fig. 3 operate to effect acceleration of the line velocity in the same manner as described for Fig. 2C, but since the oscillations are centered on the pattern surface as stated the line velocity will not be accelerated past the point where the relative out and line velocities effect angular movement corresponding to the pattern angle.

Thus, for the 30° angle of Fig. 3, similarly to the operation of Fig. 2C, when the in-out oscillations become of such small amplitude, due to the line acceleration, that the angle of movement substantially corresponds to the pattern angle, as at point X1, Fig. 3, the tracer in and out contacts do not remain closed for a sufficient interval to effect the shifting of brake valve plunger 42a through its full movement in either direction. In this instance, however, the oscillations of the valve plunger are centered about a point where the throttling effect of the tapered groove of the plunger operates to effect a resistance to the rotation of brake pump 40 in out direction sufficient to balance the resistance forces which oppose line movement, including the resistance effected by the line back pressure valve 33. The construction of the valve plunger 42a is such, as shown, that the axial pressure of the liquid acting on the plunger is balanced in any axial position thereof and the final result, at a point indicated as X2, Fig. 3, is to bring the valve plunger 42a to rest in the position where its oscillations are centered as just mentioned, at a time when the tracer stylus is positioned for both the tracer contacts to be open. The angular out movement in Fig. 3 then continues in a straight path, with relative out and line velocities proportioned to suit the pattern angle, until such time as the one or the other tracer contacts are again closed, in the manner described for the 0° angle of Fig. 2C.

It will be apparent that the straight-path result described for the operation of Figs. 2C, 3, will be similarly effected for inward pattern angles, but for inward angles the oscillations of brake valve plunger 42a are centered to oppose in movement, and the plunger comes to rest on the in throttling side of its shifting movement.

It will also be apparent that the described straight-path control result is effected in a manner such that there will be no delay in operation of the described primary direction-correction mechanism if it should occur that the pattern angle changes suddenly while the straight-path result is operating, since the valve 42 remains at all times free to shift substantially instantaneously to fully open in or out position, as for example in the operation of Fig. 4, later described.

In the operations of Figs. 2C, 3, the initial in-out oscillations start with an in-out velocity which is too fast for the instant pattern angle, but the copying result including the straight-path result will be similarly effected when it is the line velocity which is too fast. Thus in Fig. 4, for example, the pattern changes from a 0° angle to an out angle of about 30°. In such case the tracer stylus contacts the angular surface at the left thereby closing the out contact 10k whereby to shift the valve plunger 42a in out direction and to shift the relay switch 20 to a position energizing the out member 6c of the reverser clutch 6. During the straight-path line movement of Fig. 4 the valve plunger 42a is in central position, as described for Fig. 2C, but whatever its previous position the shift of the plunger 42a to out position operates to reduce the resistance opposing in-out movement, whereby the line resistance established by brake pump 30 and valve 33 as previously described operates to decelerate the line movement, and support 1 is accelerated in out direction by energy derived from the motor 3 as previously described, the result being a series of initial in-out oscillations as shown in Fig. 4 similar to those previously described for Figs. 2C, 3, and similarly operating to effect the straight-path result for the instant angle. In this case, however, the initial oscillations are of smaller amplitude, as shown, because the required change of relative support rates is less than for the operations previously described, and the straight-path result is therefore more quickly effected. A similar result would be effected if the angle of Fig. 4 were inward, instead of outward, but in such case it would be the tracer in contact 10i which was initially closed, whereby to energize the in clutch member 6b and to shift valve plunger 42a in the in direction.

It will be understood that the diagrams Figs. 2C, 3, 4, represent the initial in-out oscillations in very greatly enlarged scale, since the shifting of the valve plunger 42a for effecting the first in or out deceleration phase of the oscillations operates to effect the deceleration of support 1 in a time interval which is as nearly instantaneous as is permitted by the strength of the channel walls which confine the liquid between pump 40 and valve 42, as has been stated.

Generally stated, the present machine, similarly to the machine of said copending application Serial No. 512,112, operates for a primary tracer control of in-out movement to force the driver means to make such an adjustment of relative in or out and line velocities that the tool follows the configuration of the pattern.

More specifically, in the present machine, the initial oscillations provide a means by which the substantially rigid differential may continue to maintain its characteristic speed relationship, such that the sum of the speeds of output gears 5b, 5c equals the speed of cage 5a, although the gears do not provide, during such oscillations, an outlet for the energy delivered to the cage by the constant speed motor 3. Thus, referring to the operation of Fig. 2C for example, substantially no motor energy is required for the deceleration phases, since the position brake means uses the energy of momentum of the parts to effect the deceleration, and during the acceleration phases the average velocity and distance traversed is not sufficient to expend more than a relatively small portion of the energy delivered to the cage 5a, as has been described. The surplus energy applied to the differential cage must therefore be expended in the acceleration of the gear 5c, and the line parts driven therethrough, including support 2. Nevertheless the gears 5a, 5b, 5c continue to substantially maintain the speed relationship established by the differential interconnection throughout the described line acceleration operation.

However, during such line acceleration result in the operation of Fig. 2C, for example, the torque resistance of both the gears 5b, 5c is increased, thereby urging a reduction of the speed of cage 5a and driver 3 during an interval determined, in part, by the speed of response of the constant-speed control means (not shown) of motor 3. Any direction-change operation is therefore not completed until motor 3 is again running at its predetermined constant speed, which will not occur, however, until the in-out oscillations have been substantially eliminated by the acceleration of line velocity to effect the uniform rate of line movement required for copying the instant pattern angle without necessity for the in-out oscillations.

In effecting the last mentioned result the previously described throttle effect of the in-out brake valve 42 is of importance. Thus, the line back pressure valve 33 operates in the manner previously described to continuously urge deceleration of the line velocity with an accompanying acceleration of in-out velocity. The described in-out oscillations operate to prevent such simultaneous line-deceleration and in-out acceleration whereby to copy the pattern with relatively small in-out oscillations but the supplemental tracer-controlled adjustment of the throttle-brake valve 42, previously described, operates to balance the force of valve 33 operating for simultaneous line deceleration and in-out acceleration by establishing an equal force resisting the acceleration of the in-out movement, whereby no in-out oscillations are required for the final result, and straight-path copying without oscillations or jiggles, results when the motor 3 is again running at the predetermined constant speed, as described, at the conclusion of any direction-correction operation.

It will be seen that in the machine of Fig. 1 the force set up by the line back pressure valve 33, as described, is continuously opposed, either by the resistance established by the in-out oscillations during a direction change, or by the resistance set up by the brake-throttle operation of in-out valve 42, or by both such resistances acting simultaneously. The result is to pre-load the entire transmission system to an extent determined by the characteristics of valve 33, whereby to eliminate any lost motion or slack which might otherwise render the copying inaccurate, and to provide such a degree of rigidity to the entire system that the response to any changes of control-forces is substantially instantaneous throughout the system. Such preloading does not, however, materially increase the power required from motor 3 for the copying operations, since all acceleration results are primarily effected by a release of back pressure rather than by an increase of driving torque, and in part because the deceleration results utilize the energy of momentum, in the manner described.

The characteristics of the line back pressure control established by the valve 33, Fig. 1, provide a predetermined minimum torque constantly available on cage 5a of the differential sufficient for a predetermined rate of in-out acceleration when the in-out cutting load resistance is at a maximum value determined by the rated capacity of the machine, as has been stated. For copying operations such maximum cutting load value normally occurs during roughing operations. For finishing operations, or for certain work materials, the maximum cutting load may be relatively small and the value of the constantly available torque may be correspondingly reduced. This may be done in various ways as, for example, by suitable adjustment of the abutment of spring 33e. The threaded plug abutment shown in Fig. 1 might be used for such purpose since its forward adjustment increases the torque value and adjustment in the other direction decreases it. Another method is to provide supplemental means operative to reduce the pressure on throttle 33, as for example a solenoid 60, Fig. 1, operative from a circuit 60c, there being resistor means such as 60a adjustably determinative of the force of the solenoid, and indicator means such as 60b associated with suitable markings, not shown, to indicate the control result for the different settings. Preferably the indicator 60b should have a position, such as is indicated at 0, Fig. 1, where the solenoid 60 is of no effect.

In the copying operations of Figs. 2C, 3, 4, the torque responsive device 30, Fig. 1, operates as previously described to automatically reduce or increase the line resistance result of the back pressure valve 33. The control mechanisms of Fig. 5 is similarly operative and may be used to supplement the described torque-responsive control, or as a substitute therefor.

Figure 5:
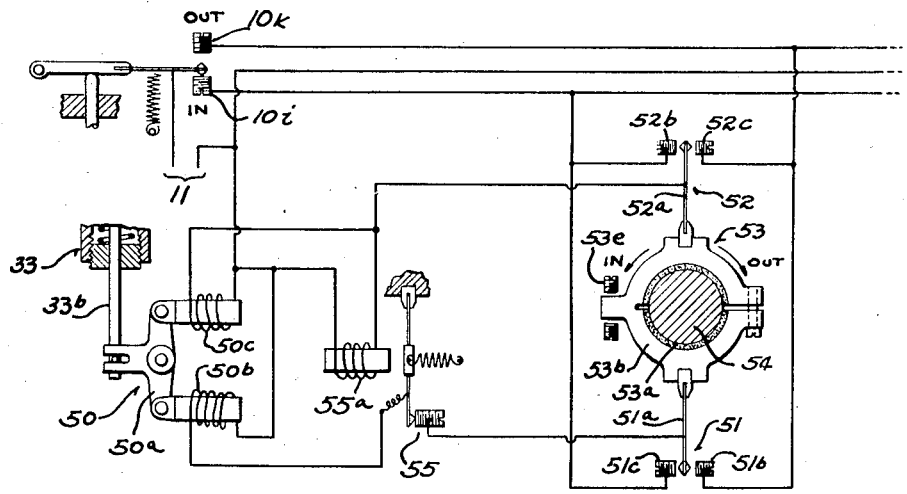
Figure 5 is a diagram of a modified or substitute form of certain of the control mechanism of the machine.

Thus, in the control mechanism of Fig. 5 the shank 33b of the line back pressure valve 33, Fig. 1, is connected to a solenoid device 50 through a pivoted lever 50a to be urged respectively in opposite directions upon energizing of different solenoids 50b, 50c. The solenoids are energizable respectively through switches 51, 52 which are associated with a device 53 carried on a shaft 54 connected to be rotatable in in or out directions according to the instant direction of movement of the in-out support 1, Fig. 1. Thus, for example, the projecting end 1aa, Fig. 1, of the screw shaft might be used for such purpose. Device 53 includes members 53a, 53b in an arrangement such that that member 53b is frictionally urged to turn in the same direction as the shaft 54, the turning movement in either direction being limited by adjustable abutment screws such as 53e. The switch 51 includes a yieldable contactor member 51a carried by the member 53b and contacts 51b, 51c closed respectively when shaft 54 rotates in in and out directions. The switch 52 includes a yieldable contactor member 52a carried by the member 53b and contacts 52b, 52c closed respectively when shaft 54 rotates in in and out directions. The contacts 52b, 51c are each connected, as shown, to be energized from circuit 11 whenever the in contact 10i of tracer 10 is closed. Similarly the contacts 52c, 51b are each connected to be energized from circuit 11 whenever the tracer out contact 10k is closed. The solenoids 50b, 50c are energizable from circuit 11 through the respective switches 51, 52, as stated, but the circuit of solenoid 50b includes a normally closed switch 55 which is interrupted upon the energizing of a coil 55a through the switch 52 under certain conditions, later explained.

The control arrangement of Fig. 5 is such that during either the in or the out deceleration phases of any direction-correction operation, such as those of Figs. 2C, 3, 4, for example, the line back pressure effect of the throttle 33a, Fig. 1, is materially reduced, and during either the in or out acceleration phases of any direction-correction operation the line back-pressure effect of the throttle is materially increased.

Thus, any in acceleration phases of the direction correction oscillations occur only when the shaft 54, Fig. 5, is revolving in in direction simultaneously with a closed tracer in contact 10i, and any out acceleration phases occur only when the shaft 54 is revolving in out direction simultaneously with a closed tracer out contact 10k, and in either case the closed tracer contact operates through switch 52 to close the circuit of solenoid 50c whereby to urge plunger 33b in a direction increasing the instant effective closing pressure on throttle 33a, Fig. 1. During each such acceleration phase the circuit of the other solenoid 50b is open at the one or the other tracer contact.

On the other hand, any in deceleration phases of the direction correction oscillations occur only when the shaft 54, Fig. 5, is revolving in in direction simultaneously with a closed tracer out contact 10k, and any out deceleration phases occur only when the shaft 54 is revolving in out direction simultaneously with a closed tracer in contact 10i and in either case, unless switch 55 is open as later described, the closed switch 51 operates to close the circuit of the solenoid 50b whereby to urge plunger 33b in a direction decreasing the instant effective closing pressure on the throttle 33a, Fig. 1. During each such deceleration phase the circuit of the other solenoid 50c is open at the one or the other tracer contact.

The switch 55 is normally closed for operation of solenoid 50b as described during any deceleration phase but during the straight path copying of 0° angles, as previously described for the operation of Fig. 2C, for example, the support 1 has zero in-out velocity and it may occur that shaft 54 has come to rest in a position such that when the pattern angle changes the closing of one or the other of the tracer contacts would energize solenoid 50b, whereby to reduce the line resistance at a time when maximum line resistance is desirable for out or in acceleration. The switch 50 operates to prevent such result, the adjustment of the several contacts of switches 51, 52 being such that if the shaft 54 should come to rest in the mentioned position the same shaft position operates to energize the acceleration solenoid 50c, and simultaneously to energize the coil 55a of switch 55 whereby to prevent the energizing of the deceleration solenoid 50b.

The previous remarks are mainly directed to the pattern-controlled operation of the machine. The machine also includes manual control mechanism for support movement in either direction in either of the support paths independently of pattern control, but in a relationship which operates for the pattern control and manual control to co-operatively supplement one another for certain purposes. The diagrams Figs. 6, 6A show the manual and semi-automatic control mechanism just mentioned together with such portions of the previously described machine as are required for an understanding of the operating relationship of the parts.

Figures 6, 6A:
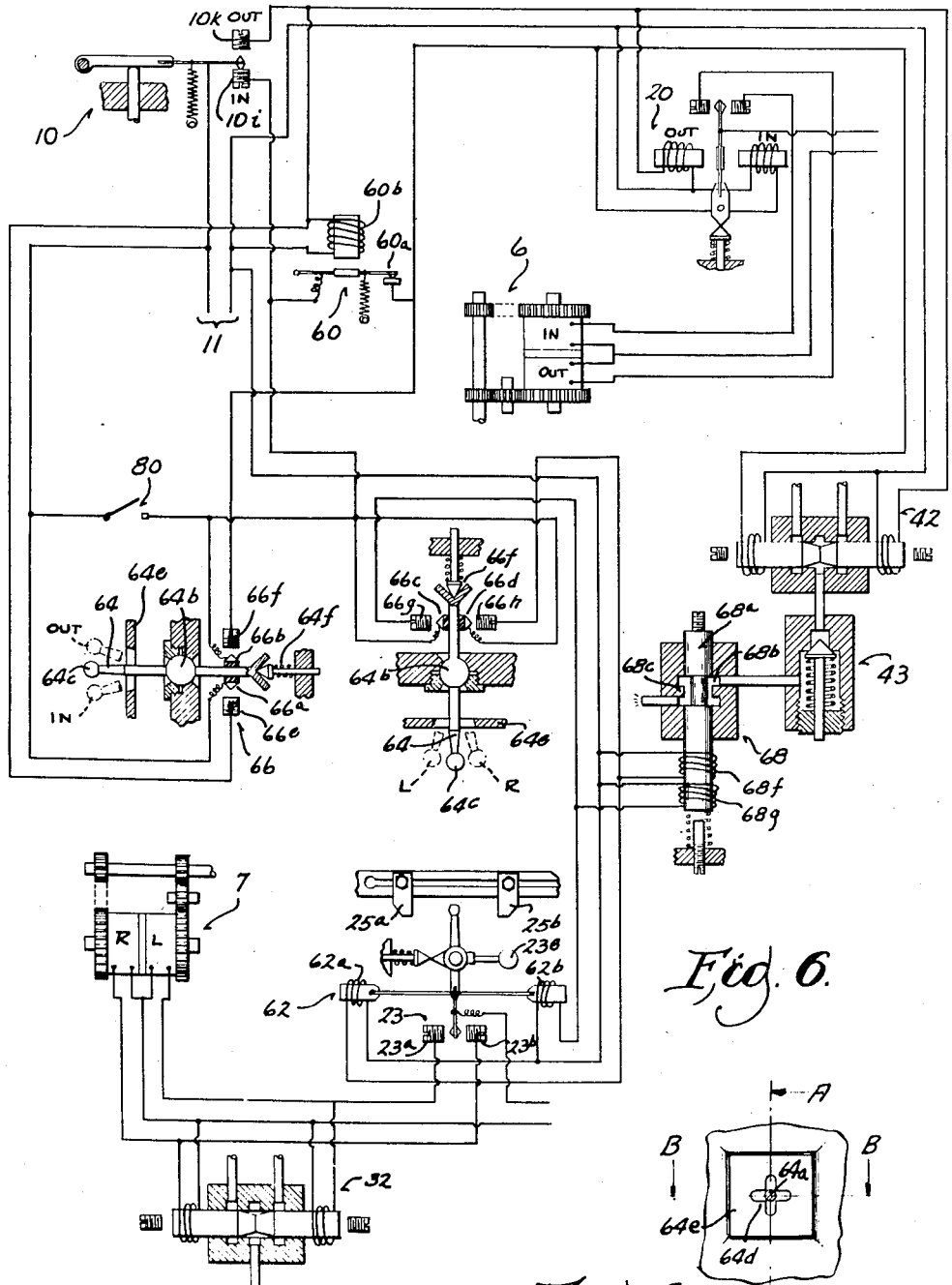
Figures 6, 6A are diagrams of certain manual control mechanism which is used for the machine of Fig. 1, together with control means operatively interconnecting the manual and pattern control mechanism for mutual cooperation.

As shown in Fig. 6, the in-out reverse clutch 6 is controlled through the relay 20, and the in-out brake valve means 42 through the coils 42e, 42f whereby to effect alternative in or out directional movements in the manner previously described for the mechanism of Fig. 1, but in Fig. 6 the circuit connection from the tracer in contact to the relay and valve shifter coils includes a normally closed contact 60a of a switch 60. When a coil 60b of switch 60 is energized by operation of the manually operable control means, as later described, the contact 60a will be opened and in such case the reverser clutch 6 and valve 42 will be operated to effect out movement, as later described, even when the tracer in contact is closed.

In the machine of Fig. 6 both the line reverser clutch 7 and the valve means 32 are controlled from the switch means 23 whereby to be controlled either from the line support dogs 25a, 25b or the manual lever 23e to effect alternative left or right line movements in the manner previously described for the mechanism of Fig. 1. Additionally, however, the switch 23 may be shifted to its left or right direction position by the means of a solenoid device 62 having coils 62a, 62b alternatively energizable by operation of the manually operable means, later described, for the opposite direction results of switch 23.

A manually operable control lever 64, Figs. 6, 6A, is shiftable for selectively effecting the in, out, left or right directions of support movement, independently of the tracer control previously described. In Fig. 6 the lever 64 and certain associated parts are twice shown, for convenience, the left-hand view being of a section taken along line A—A of Fig. 6A, the other view being of a section taken along line B—B of Fig. 6A. Lever 64 includes a shank or rod portion 64a having a ball-pivot mounting at 64b whereby an exposed handle portion 64c may be shifted selectively in the direction of out, in, right or left support movement as indicated by the dotted line positions of the handle end 64c shown in Fig. 6; the lever being prevented from movement in other directions by the engagement of the shank 64a through a slotted aperture 64d, Fig. 6A, of a fixed plate member 64e. A suitable detent means, diagrammatically indicated at 64f, operates for continuously urging the lever 64 to the central position of its movement, shown in Figs. 6, 6A, except as it is manually displaced in the one or the other of the movement directions mentioned. A switch means 66, Fig. 6, is associated with the lever 64, there being contactor elements 66a, 66b, 66c, 66d fixed with the lever for movement therewith and contacts 66e, 66f, 66g, 66h closed respectively by the different contactor elements upon movement of the lever in the out, in, right and left directions.

Upon the movement of lever 64 in out direction the contactor 66a and contact 66e completes the circuit 11 through the coil 60b of switch 60. This opens the normally closed contact 60a, whereby to interrupt the in circuit of the relay 20 and valve 42, even if the tracer in contact 10i is closed, and at the same time energizes, through the connection shown, the out circuit of relay 20 and valve 42 even if the out tracer contact is open. It results that the in-out support 1, Fig. 1, is accelerated in out direction, with simultaneous deceleration of the line support 2, Fig. 1, in the manner previously described, whereby the tracer 10 and tool 12 are withdrawn outwardly from the pattern and work. Such withdrawal operates to close the tracer in contact 10i, but such closing is of no effect so long as the lever 64 is manually retained in the out position. If the lever is then released, however, whereby to be returned to central position by operation of the detent 64f, the circuit through contact 66e is interrupted, whereby switch 60 again closes and the closed tracer in contact then operates to effect in movement of support 1, Fig. 1, in the normal tracer-controlled manner previously described, and similarly if the lever 64 is manually shifted to the in position.

The contactors 66c, 66d, Fig. 6, except as later described, are energized from source 11 only when the tracer in contact 10i is closed, as when the tracer has been withdrawn from the pattern as previously described. But in such case the manual movement of lever 64 toward the one or the other of the right or left direction positions indicated by dotted lines results in a corresponding right or left direction of movement of the line support 2, Figs. 1, 6. For effecting such line movement there is provided a shut-off valve 68 Fig. 6, having a shiftable plunger 68a, an inlet port 68b which is connected to receive the liquid from the in-out back pressure valve 43, and an outlet port 68c which is connected to a suitable reservoir, not shown. The valve plunger is normally retained by a spring in a position, shown in Fig. 6, in which the inlet and outlet ports communicate freely, as shown in Fig. 6, through an annular groove of the plunger, and continuously occupies each position for the tracer-controlled copying previously described, but upon the movement of lever 64 to either the right or left positions the circuit 11 is completed through the one or the other of contacts 66g, 66h and through the one or the other of coils 68f, 68g, whereby to shift the valve plunger 68a to a position closing the valve 68. At the same time the circuit 11 energizes one of the coils 62a or 62b of the solenoid device 62, whereby switch 23 is shifted to energize the line reverser clutch 7 and valve 32, Figs. 1, 6, for movement of line support 2 in a direction corresponding to the direction in which lever 64 has been shifted. The described closing of the valve 68 operates to prevent rotation of the in-out brake pump 40, Fig. 1, whereby in-out movement stops and the differential 5, Fig. 1, drives line support 2 in the direction determined by the position of manual lever 64. However, if the tracer stylus contacts the pattern during such manual controlled line movement the tracer in contact 10i is opened, whereby to interrupt the manual control circuit for any movement except the described out movement, and the tracer again resumes control of the movements to copy the pattern configuration in the manner previously described.

It will be seen that the described mechanism provides manual control of the various directional movements of supports 1 and 2, Fig. 1, without regard for the configuration of the pattern, provided that the control lever 64 is first operated to move the tracer and tool in out direction, away from the pattern and work, whereby the in contact 10i remains closed, as described. On the other hand if it should occur during any of the manually controlled movements that the tracer stylus contacts the pattern, whereby to displace the stylus either laterally or vertically sufficiently to open the in contact 10i, the tracer resumes its normal control function for automatic pattern control, the contactor 66a remaining energized however, whereby manual control of out direction of movement is continuously available as previously described.

The described manual control mechanism is preferably supplemented by any suitable form of start-stop switch, not shown, for the driving motor 3, whereby support movement may be stopped while the tool is at a distance from the work sufficient to permit of convenient replacement of finished work pieces, and for similar operations. Upon starting of the motor again the cutter will move toward the work piece, unless prevented by the manual control, and the tracer will operate to take over the automatic copying as described, as soon as the tracer contacts the pattern.

It will be noted that the previously described operation of the manual control means in mutual cooperation with the tracer controlled operations does not necessarily utilize the in contactor 66b or the in contact 66f, Fig. 6. These elements are required only in the event that it is desired to effect manual directional control when the tracer 10 is not present in the machine and in such case all of the manual control contactors 64a, 64b, 64c, 64d are energized directly from source 11, the contactors 64b, 64c, 64d being energized, for example, through switch means such as 80. The operation is then similar to that described except that the switch 60 is of no effect, and the lever 64 must be shifted to in position to effect in direction of movement.

Figure 7:
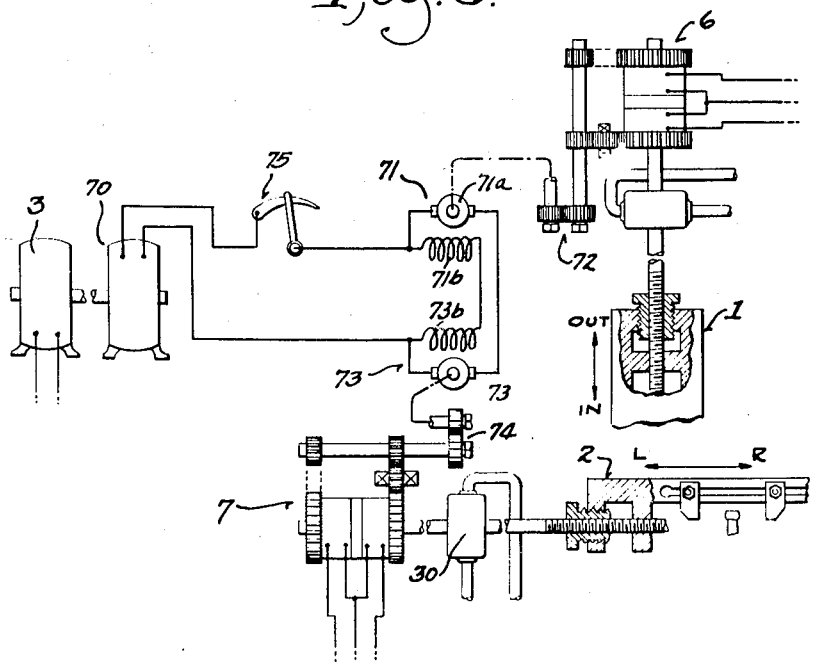
Figure 7 is a diagram of an electrical differential means which may be substituted for the mechanical differential means in the machine of Figs. 1 and 6.

Fig. 7 shows a modified form of some of the transmission mechanism of Fig. 1. In the transmission of Fig. 7 the constant speed driver 3 drives an electric generator 70, which supplies current to a unidirectional in-out motor 71 having a rotary armature 71a and a field 71b, the armature 72a driving the in-out reverser 6 through a rate change device 72 which in this instance consists of a plurality of interchangeable and replaceable gear pairs, only one pair of which is shown in Fig. 7. The generator also supplies current to a unidirectional line motor 73 having a rotary armature and a field 73b, the armature driving the line reverser 7 through a rate changer 74 having the same characteristics as rate changer 73.

The generator 70 is of a construction providing a constant-voltage output when driven from motor 3 at constant speed as described, but the voltage applied to the motors 71, 73 may be varied by the means of an adjustable resistance device 75, which acts as a stepless rate-changer, as later described. The motor armatures 71a, 73a are serially connected and the motor fields 71b, 73b are also serially connected, the field and armature circuits being in parallel connection, as shown. The fields 71b, 73b are of characteristics such as to provide equal strength of the two fields, the fields being substantially constant at any adjustment of the rate changer 75. The armatures 71a, 73a are of characteristics such that each armature when rotated at any speed within its speed range operates to generate the same value of counter-voltage opposing the applied voltage, by reason of the equal fields, as would be generated for the same applied voltage by the other armature when rotating at the same speed.

The rate changers 72, 74 are normally adjusted for equal speed ratios, and the trains connecting the armatures to the supports through these rate changers are also of equal ratio, whereby equal speeds of motors 71, 73 result in equal rates for supports 1 and 2, Fig. 1, and the described arrangement operates as an electrical differential interconnecting the reversers 6 and 7 for maintaining a constant sum of the speeds of the reversers, and of the supports 1, 2, Fig. 1, driven therethrough, similarly to the mechanical differential device 5, Fig. 1.

Thus, the current through the two armatures 71a, 73a is equal to all times whereby the equal motor fields operate to effect equal armature torques, but the arrangement will not be stable except as the sum of the counter-voltages generated by the armatures is substantially equal to the applied voltage. Such result occurs only when the sum of the speeds of the armatures, and of supports 1 and 2, has a predetermined value determined by the applied voltage, and where the rate of the in-out support 1 is tracer controlled in the manner previously described for the machine of Fig. 1 and for the operations of Figs. 2C, 3, 4, the driving means will force an adjustment of the relative support rates to suit the angle of the pattern, as previously described. For the machine of Fig. 7, however, if the line back pressure valve 33, Fig. 1, is controlled by a torque-responsive device such as 35, Fig. 1, such device may be positioned to be driven through the rate-changer 72, Fig. 7. The valve 33 may, however, be controlled instead by the alternative means shown in Fig. 5. In either event the manual control as disclosed in Fig. 6 may be similarly provided for the machine of Fig. 7.

I claim:

1. In a copying machine including a tracer and a pattern the combination of an in-out support movable to effect relative movement of said tracer and pattern alternatively in opposite directions in an in-out path, a line support movable to effect relative movement of said tracer and pattern alternatively in opposite direction in a line path, power operable transmission mechanism for said support movements, control means for adjustment of said transmission mechanism for determination of the direction and rate of support movements effected thereby, a first controller for said control means operable under the control of said tracer and pattern during movement in said line path for a tool to follow a work piece in substantial conformity with the configuration of said pattern, a second controller for said control means including a manually adjustable means having adjustment positions respectively corresponding to the opposite directions of in-out support movement and other adjustment positions respectively corresponding to the opposite directions of line support movement together with connections operable in accordance with said adjustments to effect the corresponding support direction movements, and interlock means operatively interconnecting said controllers and operative during an in direction of support movement under the control of said second controller to render said first controller operative as described and simultaneously to render said second controller inoperative for effecting an in direction of support movement.

2. In a copying machine including a tracer and a pattern the combination of an in-out support movable to effect relative movement of said tracer and pattern alternatively in opposite directions in an in-out path, a line support movable to effect relative movement of said tracer and pattern alternatively in opposite direction in a line path, power operable transmission mechanism for said support movements, control means for adjustment of said transmission mechanism for determination of the direction and rate of support movements effected thereby, a first controller for said control means operable under the control of said tracer and pattern during movement in said line path for a tool to follow a work piece in substantial conformity with the configuration of said pattern, a second controller for said control means including a manually adjustable means having adjustment positions respectively corresponding to the opposite directions of in-out support movement and other adjustment positions respectively corresponding to the opposite directions of line support movement together with connections operable in accordance with said adjustments to effect the corresponding support direction movements, and interlock means interconnecting said controllers and operative during an in direction of support movement under the control of said second controller to render said first controller operative as described and simultaneously to render said second controller inoperative for effecting any other than an out direction of support movement.

3. In a copying machine including a tracer and a pattern the combination of an in-out support movable to effect relative movement of said tracer and pattern in an in-out path, a line support movable to effect relative movement of said tracer and pattern in a line path, transmission mechanism for said support movements including a differential device comprising a driver member and two driven members differentially driven therefrom and respectively connected for support movement in different of said paths, directional control means associated with said transmission mechanism and adjustable for alternative opposite directions of movement in either of said paths, rate control means for changing the relative rates of movement of said supports including a plurality of resistance devices respectively associated with different of said driver members for opposing movement thereof, a first controller for said directional control means and said rate control means including connections operable under the control of said tracer and pattern during their relative movement in said line direction for a tool to follow a work piece in substantial accordance with the configuration of said pattern, a second controller including a single manually adjustable element and connections controlling both said directional control means and said rate control means from said element for effecting manually controlled support movements in either direction in either of said paths, and control means operated by said second controller to actuate the resistance device associated with said in-out support driver member in manner to prevent movement of said in-out support while said line support is under manually controlled movement.

4. In a copying machine including a tracer and a pattern the combination of an in-out support movable to effect relative movement of said tracer and pattern in an in-out path, a line support movable to effect relative movement of said tracer and pattern in a line path, transmission mechanism for said support movements including a differential device comprising a driver member and two driven members differentially driven therefrom and respectively connected for support movement in different of said paths, directional control means associated with said transmission mechanism and adjustable for alternative opposite directions of movement in either of said paths, rate control means for changing the relative rates of movement of said supports including a plurality of resistance devices respectively associated with different of said driven members for opposing movement thereof, a first controller for said directional control means and said rate control means including connections operable under the control of said tracer and pattern during their relative movement in said line direction for a tool to follow a work piece in substantial accordance with the configuration of said pattern, a second controller including manually operable connections controlling said directional control means and said rate control means for effecting manually controlled support movements in either direction in either of said paths, and interlock means limiting said second controller for the several support movement directions effected thereby to be effected one at a time.

5. In a copying machine including a tracer and a pattern the combination of an in-out support movable to effect relative movement of said tracer and pattern in an in-out path, a line support movable to effect relative movement of said tracer and pattern in a line path, transmission mechanism for said support movements including a differential device comprising a driver member and two driven members differentially driven therefrom and respectively connected for support movement in different of said paths, directional control means associated with said transmission mechanism and adjustable for alternative opposite directions of movement in either of said paths, rate control means for changing the relative rates of movement of said supports including a plurality of resistance devices respectively associated with different of said driven members for opposing movement thereof, a first controller for said directional control means and said rate control means including connections operable under the control of said tracer and pattern during their relative movement in said line direction for a tool to follow a work piece in substantial accordance with the configuration of said pattern, a second controller including manually operable connections controlling said directional control means and said rate control means for effecting manually controlled support movements in either direction in either of said paths, and interlock means limiting the operation of said controllers for said second controller to be operative only for an out direction of support movement during the stated operation of said first controller.

6. In a copying machine including a tracer and a pattern the combination of an in-out support movable to effect relative movement of said tracer and pattern in an in-out path, a line support movable to effect relative movement of said tracer and pattern in a line path, transmission mechanism for said support movements including a differential device comprising a driver member and two driven members differentially driven therefrom and respectively connected for support movement in different of said paths, directional control means associated with said transmission mechanism and adjustable for alternative opposite directions of movement in either of said paths, rate control means for changing the relative rates of movement of said supports including a plurality of resistance devices respectively associated with different of said driven members for opposing movement thereof, a first controller for said directional control means and said rate control means including connections operable under the control of said tracer and pattern during their relative movement in said line direction for a tool to follow a work piece in substantial accordance with the configuration of said pattern, a second controller including manually operable connections controlling said directional control means and said rate control means for effecting manually controlled support movements in either direction in either of said paths, and interlock means operatively interconnecting said controllers for an in direction of support movement under the control of said second controller to render said first controller operative as stated whenever said tracer enters a work piece zone normally controlled by said pattern.

7. In a copying machine including a tracer and a pattern the combination of an in-out support movable to effect relative movement of said tracer and pattern in an in-out path, a line support movable to effect relative movement of said tracer and pattern in a line path, transmission mechanism for said support movements including a differential device comprising a driver member and two driven members differentially driven therefrom and respectively connected for support movement in different of said paths, directional control means associated with said transmission mechanism and adjustable for alternative opposite directions of movement in either of said paths, rate control means for changing the relative rates of movement of said supports including a plurality of resistance devices respectively associated with different of said driven members for opposing movement thereof, a first controller for said directional control means and said rate control means including connections operable under the control of said tracer and pattern during their relative movement in said line direction for a tool to follow a work piece in substantial accordance with the configuration of said pattern, a second controller including manually operable connections controlling said directional control means and said rate control means for effecting manually controlled support movements in either direction in either of said paths, and interlock means operatively interconnecting said controllers for an in direction of support movement under the control of said second controller to render said first controller operative as described and simultaneously to render said second controller inoperative for effecting any support movement direction other than an out direction.

8. In a pattern controlled machine tool having a support arranged for line movement and a cooperating support arranged for in-out movement, a source of power for driving said supports, differential gearing having one element operatively connected to said source of power to be driven by it and two other elements connected to drive said supports respectively, back pressure pumps driven respectively by each of said two support driving differential elements, reversing gearing disposed in the driving connection to said in-out support, an in-out back pressure valve connected to receive the discharge from the back pressure pump associated with the in-out support driving element, a tracer mechanism operatively connected to actuate said reversing gearing and said in-out back pressure valve in manner to control movement of said in-out support in accordance with a controlling pattern, a line back pressure valve connected to receive the discharge from the back pressure pump associated with the line support driving element, and a torque responsive device connected between said source of power and said differential gearing in manner to be responsive to the driving torque exerted by said source of power and connected to said line back pressure valve in manner to operate thereon to reduce the back pressure exerted thereby upon increase in driving torque to permit increase in the speed of movement of said line support.

9. In a pattern controlled machine tool having a support arranged for line movement and a cooperating support arranged for in-out movement, a source of power for driving said supports, differential gearing having one element operatively connected to said source of power to be driven by it and two other elements connected to drive said supports respectively, back pressure pumps driven respectively by said in-out support driving differential element, reversing gearing disposed in the driving connection to said in-out support, a back pressure valve connected to receive the discharge from said back pressure pump associated with said in-out support driving element, and a tracer mechanism operatively connected to actuate said reversing gearing and said back pressure valve in manner to control movement of said in-out support in accordance with a controlling pattern.

10. In a pattern controlled machine tool having a support arranged for line movement and a cooperating support arranged for in-out movement, a source of power for driving said supports, differential gearing having one element operatively connected to said source of power to be driven by it and two other elements connected to drive said supports respectively, back pressure pumps driven respectively by each of said two support driving differential elements, reversing gearing disposed in the driving connection to said in-out support, an in-out back pressure valve connected to receive the discharge from the back pressure pump associated with the in-out support driving element, a tracer mechanism operatively connected to actuate said reversing gearing and said in-out back pressure valve in manner to control movement of said in-out support in accordance with a controlling pattern, a line back pressure valve connected to receive fluid discharged from the back pressure pump associated with the line support driving element, a torque responsive device connected between said source of power and said differential gearing in manner to be responsive to the driving torque exerted by said source of power and connected to said line back pressure valve in manner to operate thereon to reduce the back pressure effect upon increase in driving torque to permit increase in the speed of movement of said line support, a device operatively connected to said in-out support and to said tracer mechanism in manner to be responsive to the direction of movement of said in-out support and to the operation of said tracer mechanism in controlling said movement thereby being responsive to acceleration and deceleration phases of operation, and control means operatively connected to said acceleration-deceleration device and to said line back pressure valve and operative upon said line back pressure valve in response to said acceleration-deceleration device in manner to increase the back pressure effect during acceleration phases and to decrease the back pressure effect during deceleration phases of movement of said in-out support.

11. In a tracer controlled machine tool, a carriage arranged for in-out copying movement, a tracer operatively connected to control said carriage in its in or out movement automatically in accordance with the requirements of a pattern being traced, a separate manually operable control element movable for effecting out movement of said carriage regardless of said tracer, control means connected to said manually operable control element and operative thereby in response to movement thereof to effect out movement of said carriage, and a control system connected to said manually operable control element in manner to respond to movement thereof in effecting out movement of said carriage and operative to render inoperative said tracer control for in movement of said carriage while said manual control is effecting out movement thereof.

12. In a tracer controlled machine tool, a carriage arranged for line movement, another carriage arranged for in-out movement in cooperating relationship with said line movement carriage, a tracer control system operatively connected to said in-out carriage in manner to effect in-out movements of said in-out carriage automatically in accordance with the requirements of a pattern being traced, control means connected to said control system and to said line carriage and operative to effect coordinate cooperative movement of said line carriage, a manual control element connected to said line carriage and operable to effect line movement of said line carriage in either direction selectively independently of said coordinate control means, and a control system connected to said tracer control system and to said manual control element in manner to be operative only when said tracer control system is positioned to effect in movement of said in-out carriage and responsive to said manual control element to prevent in movement of said in-out carriage and to effect line movement of said line carriage in accordance with the requirement of said manual control element.

13. In a tracer controlled machine tool, a carriage arranged for in-out copying movement, a tracer operatively connected to control said carriage in its in or out movement automatically in accordance with the requirements of a pattern being traced, a manually operable control element for effecting out movement of said carriage, a switch connected to said manually operable control element in manner to respond to movement thereof and operative to effect out movement of said carriage, and a control system including another switch connected to respond to movement of said manually operable control element in effecting out movement of said carriage and operative to render inoperative said tracer control for in movement of said carriage.

14. In a tracer controlled machine tool, a carriage arranged for line movement, another carriage arranged for in-out movement in cooperating relationship with said line movement carriage, a tracer control system operatively connected to said in-out carriage in manner to effect in-out movements of said in-out carriage automatically in accordance with the requirements of a pattern being traced, a manual control element operatively connected to said line carriage in manner to effect line movement of said line carriage in either direction selectively, a control system connected to said tracer control system and including a switch effective to render said manual control element operative only when said tracer control system is in position to effect in movement of said in-out carriage, and a control device connected to said manual control element and operative in response thereto to prevent in movement of said in-out carriage during line movement of said line carriage under the control of said manual control element.

15. In a tracer controlled machine tool, a carriage arranged for in-out copying movement, a tracer operatively connected to control said carriage in its in or out movement automatically in accordance with the requirements of a pattern being traced, power operated means connected to effect tracer controlled in movement of said carriage, power operated means connected to effect tracer controlled out movement of said carriage, a manually operable control element for effecting out movement of said carriage, means responsive to said manually operable control element connected to said power operated means for out movement and operative upon manual actuation of said control element to effect out movement of said carriage, and a control system connected to said manually operable control element in manner to respond to movement thereof in effecting out movement of said carriage and operative to render inoperative said power operated tracer controlled means for in movement thereof.

FRED A. PARSONS.

REFERENCES CITED

The following references are of record in the file of this patent:

UNITED STATES PATENTS

| Number | Name | Date |
|---|---|---|
| 1,810,821 | Eck | June 16, 1931 |
| 1,900,331 | Clarke | Mar. 7, 1933 |
| 1,978,389 | Sassen | Oct. 23, 1934 |
| 2,025,748 | Howe | Dec. 31, 1935 |
| 2,039,294 | Campbell | May 5, 1936 |
| 2,168,777 | McCreary | Aug. 8, 1939 |
| 2,250,241 | Thalmann | July 22, 1941 |
| 2,330,567 | Ehrenberg | Sept. 28, 1943 |
| 2,332,532 | Roehm | Oct. 26, 1943 |
| 2,335,304 | Parsons | Nov. 30, 1943 |
| 2,335,305 | Parsons | Nov. 30, 1943 |